United States Patent
Sakamoto

(10) Patent No.: US 9,710,891 B2
(45) Date of Patent: Jul. 18, 2017

(54) IMAGING APPARATUS FOR DIAGNOSIS, METHOD OF CONTROLLING THE SAME, PROGRAM, AND COMPUTER-READABLE STORAGE MEDIUM

(71) Applicant: TERUMO KABUSHIKI KAISHA, Shibuya-ku, Tokyo (JP)

(72) Inventor: Masayuki Sakamoto, Hadano (JP)

(73) Assignee: TERUMO KABUSHIKI KAISHA, Shibuya-Ku, Tokyo (JP)

( * ) Notice: Subject to any disclaimer, the term of this patent is extended or adjusted under 35 U.S.C. 154(b) by 0 days.

(21) Appl. No.: 14/865,574

(22) Filed: Sep. 25, 2015

(65) Prior Publication Data
US 2016/0092749 A1 Mar. 31, 2016

(30) Foreign Application Priority Data
Sep. 26, 2014 (JP) .................................. 2014-197555

(51) Int. Cl.
| G06K 9/00 | (2006.01) |
| G06T 5/00 | (2006.01) |
| G06T 7/00 | (2017.01) |
| G06T 5/30 | (2006.01) |

(52) U.S. Cl.
CPC ................ *G06T 5/00* (2013.01); *G06T 5/007* (2013.01); *G06T 5/30* (2013.01); *G06T 7/0012* (2013.01); *G06T 2207/10101* (2013.01); *G06T 2207/30101* (2013.01)

(58) Field of Classification Search
None
See application file for complete search history.

(56) References Cited

U.S. PATENT DOCUMENTS

| 7,738,941 | B2 * | 6/2010 | Hirota | A61B 5/0066 |
| | | | | 600/407 |
| 2004/0081343 | A1 * | 4/2004 | Takeo | G06T 7/0012 |
| | | | | 382/131 |
| 2006/0002615 | A1 * | 1/2006 | Fu | A61B 6/5235 |
| | | | | 382/254 |
| 2007/0232891 | A1 * | 10/2007 | Hirota | A61B 5/0066 |
| | | | | 600/407 |
| 2014/0111558 | A1 * | 4/2014 | Ishitani | G09G 5/10 |
| | | | | 345/690 |

FOREIGN PATENT DOCUMENTS

JP 2007-267867 A 10/2007

\* cited by examiner

*Primary Examiner* — Nancy Bitar
(74) *Attorney, Agent, or Firm* — Buchanan Ingersoll & Rooney PC

(57) ABSTRACT

An imaging apparatus and method is disclosed for diagnosis, which includes a closing processing performed on a cross-sectional image, which is obtained based on light interference data and is orthogonal to a blood vessel axis, based on a morphological operation in order to detect low concentration site having a size less than or equal to the a predetermined size which is smaller than that of the vascular lumen. Moreover, a cross-sectional image before the processing is subtracted from the obtained cross-sectional image and the cross-sectional image after the subtraction is displayed.

20 Claims, 10 Drawing Sheets

3D INFORMATION

3D INFORMATION

700

IMAGING APPARATUS FOR DIAGNOSIS, METHOD OF CONTROLLING THE SAME, PROGRAM, AND COMPUTER-READABLE STORAGE MEDIUM

CROSS-REFERENCES TO RELATED APPLICATIONS

This application claims priority to Japanese Patent Application No. 2014-197555 filed on Sep. 26, 2014, the entire content of which is incorporated herein by reference.

TECHNICAL FIELD

The present disclosure generally relates to an imaging apparatus for diagnosis, a method of controlling the same, a program, and a computer-readable storage medium.

BACKGROUND DISCUSSION

Intravascular treatment using a highly functional catheter, for example, such as a balloon catheter and a stent can be performed. In general, an imaging apparatus for diagnosis such as an optical coherence tomography (OCT) apparatus has been used for diagnosis before surgery or to confirm progress after surgery.

The optical coherence tomography apparatus incorporates an optical fiber, to which an imaging core having an optical lens and an optical mirror is attached to a distal end, and uses a probe of which at least a distal portion has a transparent sheath. The probe is guided into a blood vessel of a patient and radial scanning is performed by illuminating the blood vessel wall with light through the optical mirror while rotating the imaging core and by receiving reflected light from the blood vessel through the optical mirror again. A cross-sectional image of the blood vessel is constituted based on the obtained reflected light. Then, three-dimensional image of an inner wall of the blood vessel in a longitudinal direction is formed by performing a pulling operation (which is generally called pull-back) at a predetermined speed while rotating the optical fiber (JP-A-2007-267867). In addition, a swept-source optical coherence tomography (SS-OCT) apparatus using wavelength sweep has also been developed as a type of the OCT.

SUMMARY

A stent can be made of metal such as stainless steel or the like. For this reason, light emitted from an imaging core is reflected from the stent at significantly higher intensity than from a vascular tissue. Therefore, it can be relatively easy to detect the stent from an OCT image.

However, in recent years, a bioresorbable vascular scaffold (BVS), which is produced by a polymer and is resorbed in a living body have been used. The BVS is also called a completely decomposed stent or a completely bioresorbable drug-eluting stent, and is different from the metallic stent. This nonmetallic BVS is formed of a member, which can be transparent or almost transparent to light in the OCT, and light is transmitted therethrough. For this reason, a stent detection algorithm of the conventional metallic stent cannot be applied.

The present disclosure provides a technology of detecting a low-luminance portion due to no reflection or little reflection of light of the BVS or the like, from an OCT image.

An imaging apparatus is disclosed for diagnosis, which can include a probe which accommodates an imaging core that performs transmission and reception of a signal; a generation unit which repeats the transmission and reception of a signal with respect to an imaging target object and generates a tomographic image of the imaging target object; and a detection unit which detects a low luminance region, of which a pixel value is comparatively lower than a pixel value around the low luminance region, as a detection target region, by performing a morphological operation in the tomographic image.

A method is disclosed of controlling an image processing apparatus which processes an image of a target object, the method comprising: inserting a probe which accommodates an imaging core that performs transmission and reception of a signal into a living body; repeating the transmission and reception of a signal with respect to an imaging target object and generating a tomographic image of the imaging target object; and detecting a low luminance region, of which a pixel value is comparatively lower than a pixel value around the low luminance region, as a detection target region, by performing a morphological operation in the tomographic image.

According to the present disclosure, a low-luminance portion can be detected due to no reflection or little reflection of light of the BVS or the like, from an OCT image.

DETAILED DESCRIPTION

Hereinafter, embodiments relating to the present disclosure will be described in detail with reference to the accompanying drawings.

Figure 1:
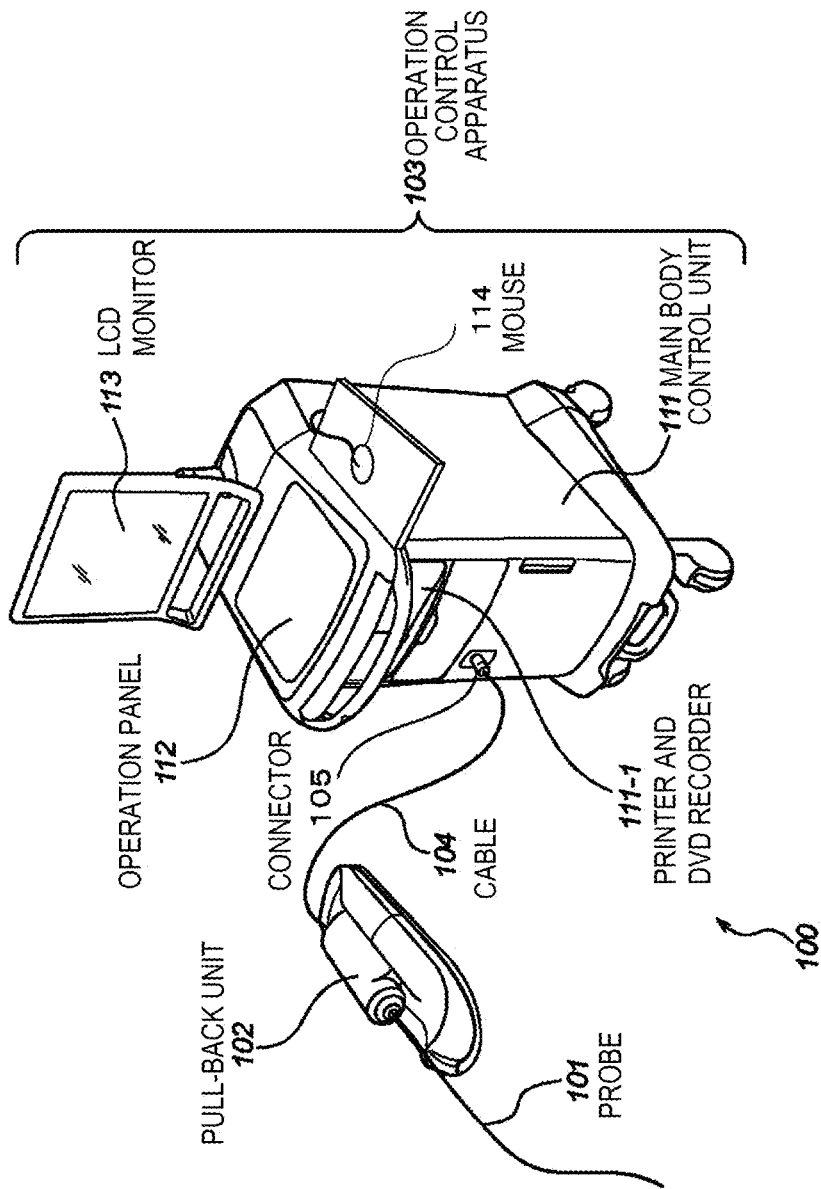
FIG. 1 is a view showing an appearance configuration of an imaging apparatus for diagnosis according to an exemplary embodiment.

FIG. 1 is a view showing an example of an overall configuration of an imaging apparatus for diagnosis 100 using wavelength sweep according to an embodiment of the present disclosure.

The imaging apparatus for diagnosis 100 can include a probe (or catheter) 101, a pull-back unit 102, and an operation control apparatus 103. The pull-back unit 102 and the operation control apparatus 103 are connected by a cable 104 through a connector 105. An optical fiber and various signal lines are accommodated in the cable 104.

The probe 101 accommodates the optical fiber rotatably. A distal end of the optical fiber is provided with an imaging core 250 having an optical transmitting and receiving unit which is provided for transmitting light (measurement light), which is transmitted through the pull-back unit 102 from the operation control apparatus 103, in a direction approximately orthogonal to a central axis of the optical fiber, and is provided for receiving reflected light of the transmitted light, from the outside.

The pull-back unit 102 holds the optical fiber in the probe 101 through an adaptor, which is provided in the probe 101. The imaging core, which is provided at the distal end of the optical fiber, rotates by driving a motor, which is incorporated in the pull-back unit 102 to rotate the optical fiber in the probe 101. In addition, the pull-back unit 102 also performs processing of pulling (this is a reason why the unit is called a pull-back unit) the optical fiber in the probe 101 at a predetermined speed by driving the motor which is provided in an incorporated linear drive unit.

With the aforesaid configuration, the inside of a blood vessel can be scanned by 360 degrees by driving a radial scanning motor (reference numeral 241 in FIG. 2) which guides the probe 101 into the blood vessel of a patient and is incorporated in the pull-back unit 102 to rotate the optical fiber in the probe. Furthermore, the scanning is performed along the blood vessel axis by the pull-back unit 102, which pulls the optical fiber in the probe 101 at a predetermined speed using the linear drive unit (reference numeral 243 in FIG. 2). As a result, a tomographic image can be constructed, which is viewed from the inside of the blood vessel at each site of the blood vessel axis.

The operation control apparatus 103 has a function of integrally controlling an operation of the imaging apparatus for diagnosis 100. The operation control apparatus 103 has, for example, a function of inputting various set values based on an instruction of a user, into the apparatus, or a function of processing data, which is obtained through measurement, and displaying the processed data as a tomographic image in a lumen in a living body.

The operation control apparatus 103 is provided with a main body control unit 111, a printer and DVD recorder 111-1, an operation panel 112, and an LCD monitor 113. The main body control unit 111 generates an optical tomographic image. The optical tomographic image is generated by generating interference light data by causing reflected light, which is obtained through measurement, to interfere with reference light, which is obtained by separating light from a light source; and by processing line data, which is generated, based on the interference light data.

The printer and DVD recorder 111-1 prints a processing result in the main body control unit 111 or stores the processing result as data. The operation panel 112 is a user interface in which a user inputs various set values and instructions. The LCD monitor 113 functions as a display apparatus and, for example, displays a tomographic image, which is generated in the main body control unit 111. The reference numeral 114 is a mouse as a pointing device (coordinate input device).

Figure 2:
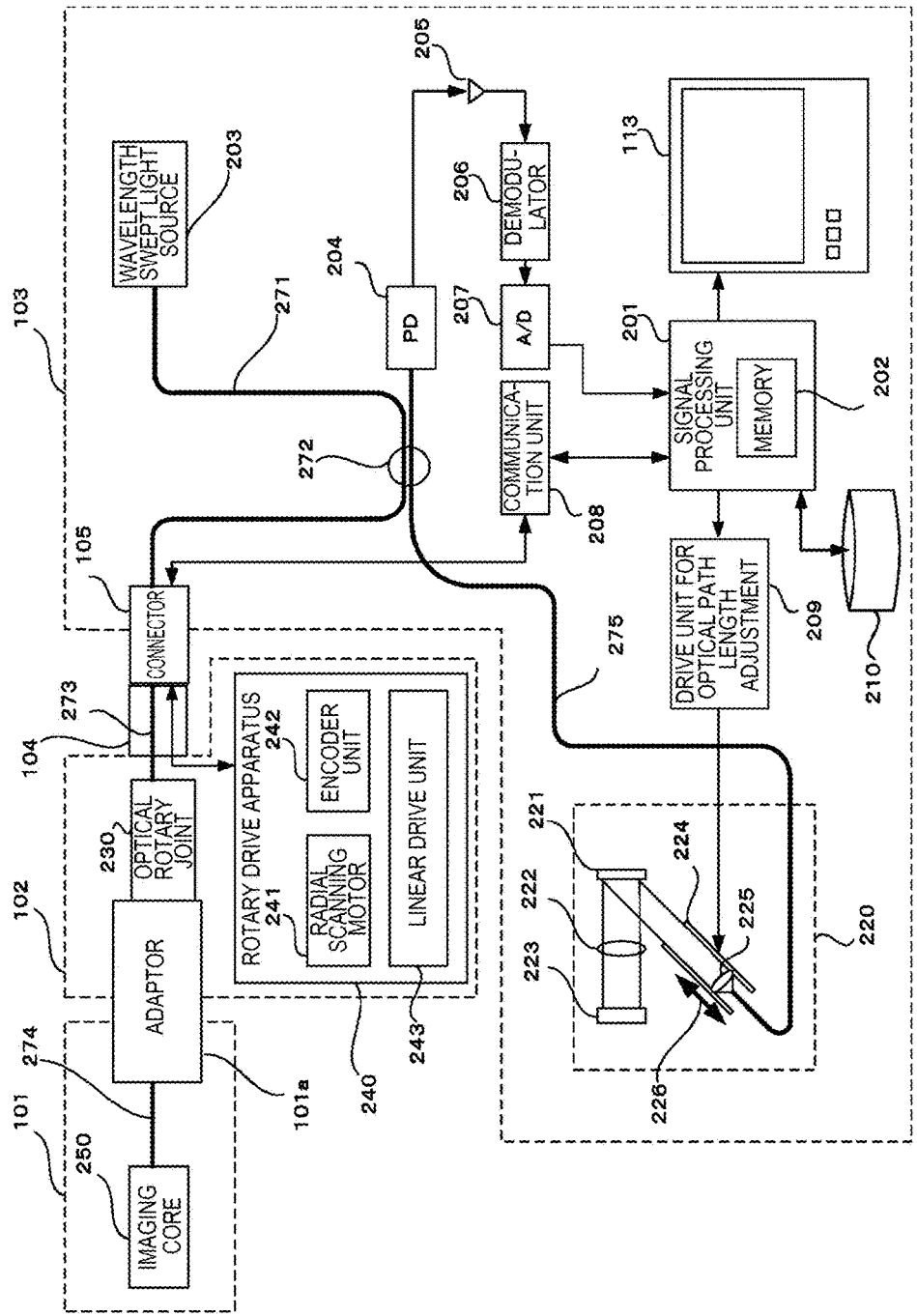
FIG. 2 is a view showing a configuration of the imaging apparatus for diagnosis in accordance with an exemplary embodiment.

Next, a functional configuration of the imaging apparatus for diagnosis 100 will be described. FIG. 2 is a block configuration view of the imaging apparatus for diagnosis 100. Hereinafter, the functional configuration of swept source OCT will be described using the drawing.

In the drawing, the reference numeral 201 is a signal processing unit which manages overall control of the imaging apparatus for diagnosis, and is constituted of several circuits including a microprocessor. The reference numeral 210 is a non-volatile storage device, which is represented by a hard disk and in which various programs or data files which are executed by the signal processing unit 201 can be stored. The reference numeral 202 is a memory (RAM) which is provided in the processing unit 201. The reference numeral 203 is a wavelength swept light source and is a light source, which can repeatedly generate light of a wavelength which varies within a predetermined range along a time axis.

Light output from the wavelength swept light source 203 is incident on one end of a first single mode fiber 271 and is transmitted to a distal side. The first single mode fiber 271 is optically bound to a fourth single mode fiber 275 in an optical fiber coupler 272 in the middle of the fibers.

Light which has been in the first single mode fiber 271 and has been emitted to the distal side from the optical fiber coupler 272 is guided to a second single mode fiber 273 through the connector 105. The other end of the second single mode fiber 273 is connected to an optical rotary joint 230 in the pull-back unit 102.

In contrast, the probe 101 has an adaptor 101a for connecting the pull-back unit 102. The probe 101 is stably held by the pull-back unit 102 by connecting the probe 101 to the pull-back unit 102 using the adaptor 101a. Furthermore, an end portion of a third single mode fiber 274, which is rotatably accommodated in the probe 101 is connected to the optical rotary joint 230. As a result, the second single mode fiber 273 and the third single mode fiber 274 can be optically bound to each other. The other end (on a leading portion side of the probe 101) of the third single mode fiber 274 is provided with the imaging core 250 which is equipped with a mirror and a lens in which light is emitted in a direction approximately orthogonal to a rotation axis.

As a result, the light emitted from the wavelength swept light source 203 is guided to the imaging core 250 which is provided at the end portion of the third single mode fiber 274 through the first single mode fiber 271, the second single mode fiber 273, and the third single mode fiber 274. The imaging core 250 emits the light in the direction orthogonal to the axis of the fibers and receives reflected light thereof. The received reflected light is then reversely guided so as to return to the operation control apparatus 103.

In contrast, an optical path length adjustment mechanism 220, which finely adjusts the optical path length of reference light is provided at an end portion opposite to the fourth single mode fiber 275 which is bound by the optical fiber coupler 272. The optical path adjustment mechanism 220 functions as an optical path length changing unit, which changes the optical path length corresponding to the variation in the length of individual probe 101 so that the variation in the length of the individual probe can be absorbed in a case where, for example, the probe 101 is replaced. For this reason, collimating lens 225 positioning at an end portion of the fourth single mode fiber 275 is provided on a movable one-axis stage 224 as shown by an arrow 226 in an optical axis direction of the collimating lens.

In accordance with an exemplary embodiment, the one-axis stage 224 functions as an optical path length changing unit which has a variable range of the optical path length enough to be able to absorb the variation in the optical path length in the probe 101 when the probe 101 is replaced. Furthermore, the one-axis stage 224 also has a function as an adjustment unit that adjusts an offset. For example, even in a case where a distal end of the probe 101 does not come into close contact with the surface of a biological tissue, a state can be set in which reference light is allowed to interfere with reflected light from a position of the surface of the biological tissue by minutely changing the optical path length of the reference light using the one-axis stage.

Light, of which the optical path length is finely adjusted by the one-axis stage 224 and which is reflected by a mirror 223 through a grating 221 and a lens 222, is guided to the fourth single mode fiber 275 again. The guided light is mixed with light, which is obtained from the first single mode fiber 271 side, by the optical fiber coupler 272 and is then received by a photodiode 204 as interference light.

The interference light, which has been received by the photodiode 204 in this manner, is photo-electrically converted and amplified by an amplifier 205, and is then input to a demodulator 206. Demodulation processing in which only a signal component of the interfered light is extracted is performed in the demodulator 206 and the output is input to an A/D convertor 207 as an interference light signal.

In the A/D convertor 207, the interference light signal is sampled by, for example, 2048 points at 90 MHz to generate digital data (interference light data) of one line. Note that the sampling frequency is set to 90 MHz on the assumption that about 90% of the period (25 μsec) of the wavelength sweep is extracted as digital data of 2048 points when the repetition frequency of the wavelength sweep is set to 40 kHz, and the present disclosure is not particularly limited thereto.

The interference light data in a line unit which has been generated by the A/D convertor 207 is input to the signal processing unit 201 and is temporarily stored in the memory 202. Moreover, in the signal processing unit 201, the interference light data is frequency-resolved through FFT (fast Fourier transformation) to generate data (line data) in a depth direction. An optical cross-sectional image is constructed at each position in a blood vessel by coordinate-converting the generated data and is output to the LCD monitor 113 at a predetermined frame rate.

The signal processing unit 201 is further connected to a drive unit for optical path length adjustment 209 and a communication unit 208. The signal processing unit 201 performs control (optical path length control) of the position of the one-axis stage 224 through the drive unit for optical path length adjustment 209.

The communication unit 208 incorporates several drive circuits and communicates with the pull-back unit 102 under the control of the signal processing unit 201. Specific examples of the communication include supply of a drive signal for rotating the third single mode fiber, to a radial scanning motor, using the optical rotary joint in the pull-back unit 102; reception of a signal for detecting a rotational position of the radial scanning motor, from an encoder unit 242; and supply of a drive signal for pulling the third single mode fiber 274 at a predetermined speed, to a linear drive unit 243.

Note that the previously mentioned processing in the signal processing unit 201 is realized using a predetermined program which is executed by a computer.

In the previously mentioned configuration, when the probe 101 is positioned at a blood vessel position (coronary artery or the like) of a patient which is to be diagnosed, a transparent flush solution (generally, physiological salt solution or contrast agent) is discharged into the blood vessel through the distal end of the probe through an operation of a user. This can be performed in order to exclude the influence of blood. Moreover, when a user inputs an instruction for starting scanning, the signal processing unit 201 drives the wavelength swept light source 203 and drives the radial scanning motor 241 and the linear drive unit 243 (hereinafter, emission of light and light receiving processing using the radial scanning motor 241 and the linear drive unit 243 are referred to as scanning). As a result, the wavelength swept light from the wavelength swept light source 203 is supplied to the imaging core 250 through the previously mentioned route. At this time, the imaging core 250, which is, positioned at the distal end of the probe 101 moves along a rotation axis while rotating. Therefore, the imaging core 250 performs emission of light to the lumen surface of a blood vessel and reception of reflected light thereof while rotating and moving along a blood vessel axis.

Figure 3:
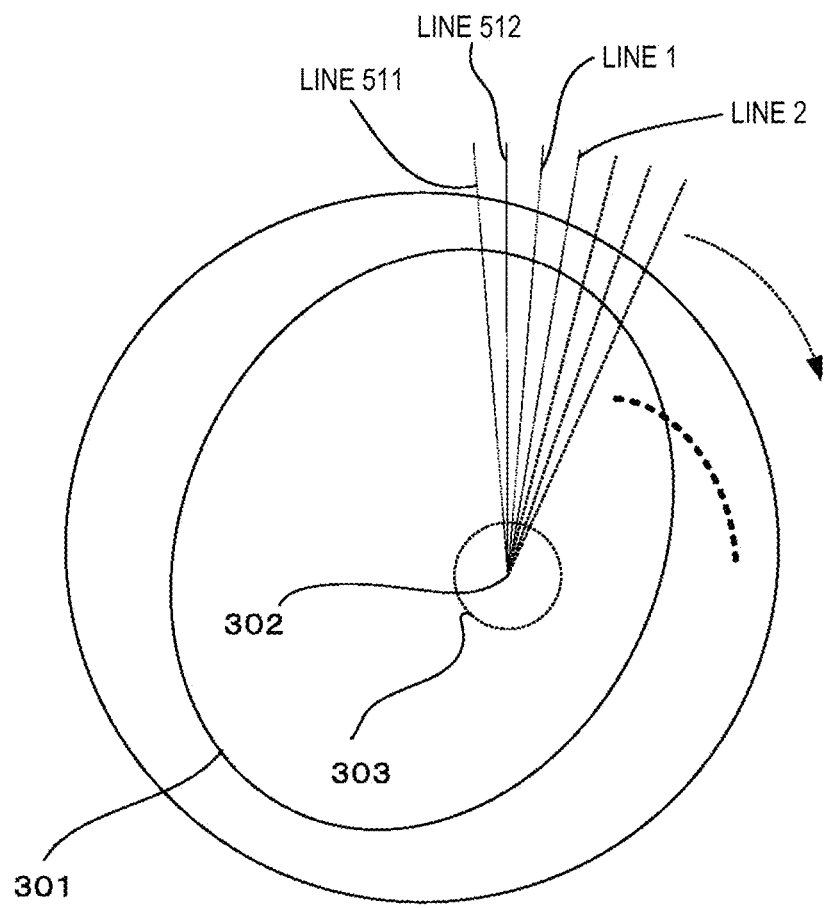
FIG. 3 is a view for illustrating reconstitution processing of a cross-sectional image.
Figure 4:
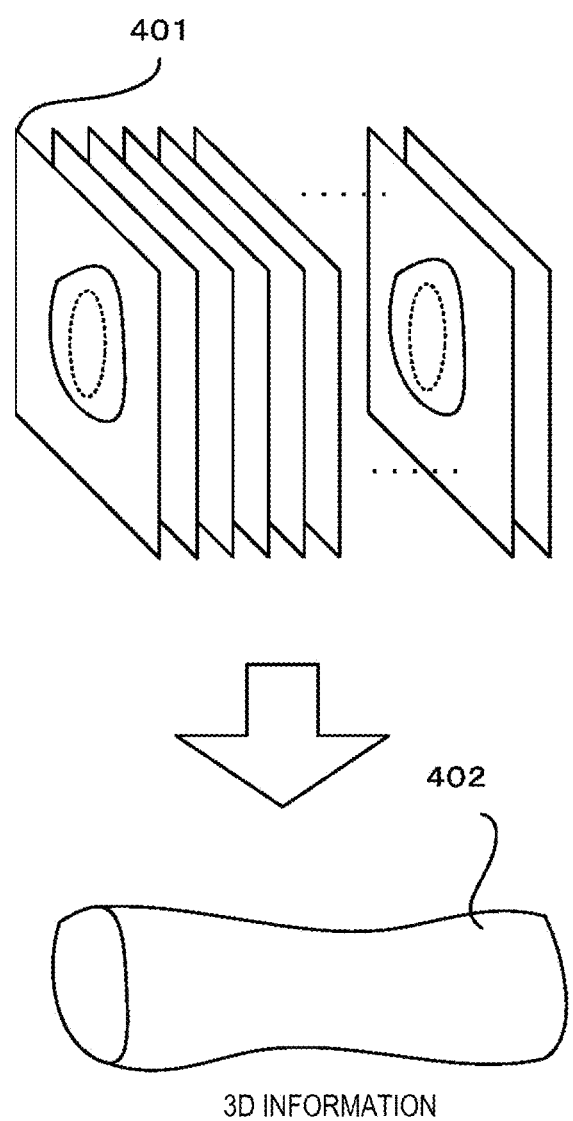
FIG. 4 is a view showing a relationship between the reconstituted cross-sectional image and three-dimensional model data.

Here, processing for generating one optical cross-sectional image will be simply described using FIG. 3. The drawing is a view for illustrating reconstitution processing of a cross-sectional image of a lumen surface 301, which is substantially orthogonal to the blood vessel axis of a blood vessel on which the imaging core 250 is positioned. A plurality of times of transmission and reception of measurement light are performed during one rotation (360 degrees) of the imaging core 250. Through one time of the transmission and reception of light, data of one line can be obtained in a direction in which the light is emitted. Accordingly, 512 interference light data pieces extending radially from a rotation center 302 can be obtained by performing, for example, 512 times of the transmission and reception of light during one rotation. The 512 interference light data pieces are subjected to fast Fourier transformation and line data in a radial direction in a radial shape from the rotation center are generated. The line data are close to each other in the vicinity of the rotation center position and are sparse to each other as the data are separated from the rotation center position. Pixels in the vacant space between lines are generated by performing well-known interpolation processing and vascular cross-sectional images, which can be visible, for example, by a human can be generated. As shown in FIG. 4, a three-dimensional blood vessel image 402 can be obtained by connecting the generated two-dimensional cross-sectional images 401 to each other along the blood vessel axis. Note that the central position of the two-dimensional cross-sectional images is coincident with the rotation center position of the imaging core 250. However, it should be noted that the central position of the two-dimensional cross-sectional images is not coincident with the central position of the cross section of the blood vessel. Although the influence is small, light is reflected by the surface of the lens of the imaging core 250, the surface of the catheter, and therefore, several concentric circles are generated with respect to the rotation center axis as shown by the reference numeral 303 in the drawing. The signal processing unit 201 stores the reconstituted vascular cross-sectional images 401 and three-dimensional blood vessel image 402 in the memory 202.

Next, processing of detecting a stent in a cross-sectional image of a blood vessel, in which a BVS is indwelled, will be described with reference to FIG. 5. As described above, the BVS has a property, which is transparent or almost transparent to measurement light in the OCT. Therefore, light is transmitted therethrough and the BVS is displayed black as the cross-sectional image. For this reason, for example, it can be impossible to automatically detect the BVS in a stent detection algorithm of the conventional metallic stent. However, in the present embodiment, the BVS is automatically detected.

Figure 5:
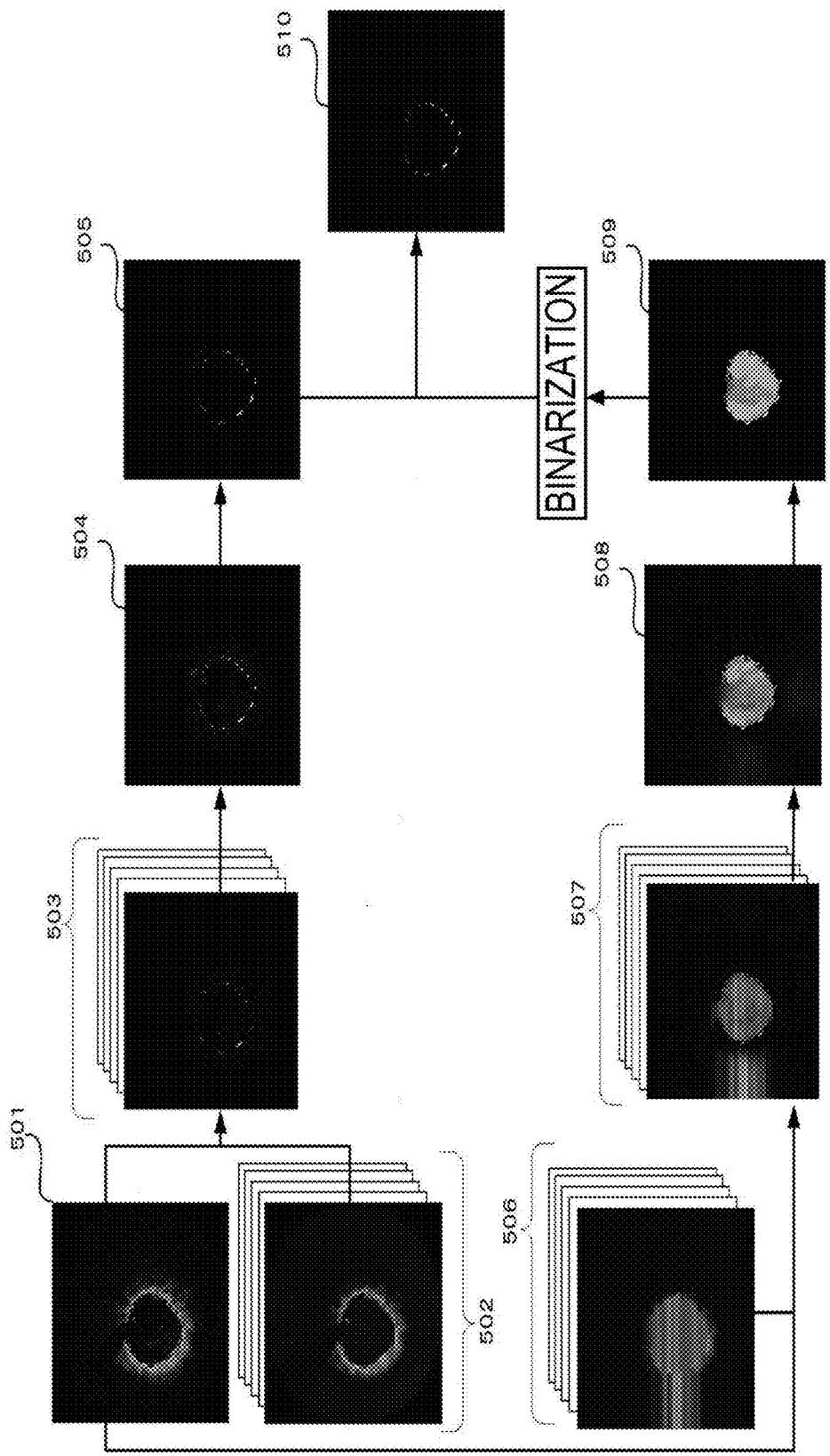
FIG. 5 is a view showing an algorithm of detecting a BVS in accordance with an exemplary embodiment.

In FIG. 5, the reference numerals 501 to 510 show cross-sectional images of a surface, which is substantially orthogonal to a blood vessel axis.

The cross-sectional image 501 shows a cross-sectional image immediately after being reconstituted through the above-described processing. In accordance with an exemplary embodiment, in the cross-sectional image 501, a region which is strongly reflected is represented whiter and a region which is not reflected is represented blacker. A little reflected light is obtained from the surface of the BVS while the BVS is formed of a member which is transparent or almost transparent to measurement light in the OCT. Accordingly, the BVS in the reconstituted cross-sectional image has a predetermined (already known) size or smaller and has characteristics in which a hole is open, of which the periphery is white (high luminance) and the middle is black (low luminance).

In the present embodiment, the aforementioned problem can be solved by performing processing of filling the hole. Examples of the processing which is favorable for realizing the processing include closing processing in a morphological operation. An anisotropic structural element is used as a structural element used during the processing. Note that in the present embodiment, a flat and linear structural element is used. A parameter L1 which characterizes the size and the form of the structural element is set based on the size of a hole which is detected as a scaffold. The size of the scaffold is already known immediately after the scaffold is indwelled, and for example, the thickness of the scaffold before indwelling which is a size of the scaffold in a depth direction is set. Since the BVS is resorbed, the size thereof decreases over time. However, the BVS in the parameter based on the thickness of the scaffold before indwelling can be detected, as it is. However, it is necessary to set a separate parameter in order to improve the accuracy. As the method of setting the parameter L1, a parameter may be manually input from the size of the scaffold while checking a usual OCT image, or a parameter may be reflected by calculating the parameter from a value which is obtained by measuring the size of the scaffold using a distance measurement tool of the apparatus. In addition, a parameter may be calculated by previously generating a curve of the change in the size of the scaffold over time and by estimating the size of the scaffold from the lapse of time after indwelling. With use of a structural element having the parameter which can be set as described above, a cross-sectional image 502 can be obtained by performing the closing processing on the cross-sectional image 501.

The cross-sectional image 502 is a cross-sectional image on which the inside of the BVS, which seems have an opened hole, is filled with a white color. Therefore, a black hat image 503 (0) is obtained by performing black hat (bottom hat) processing in which the cross-sectional image 501 is subtracted from the cross-sectional image 502. However, in some cases, the BVS which is to be detected in the black hat image in this stage has low luminance. Therefore, tone correction is performed in order to increase the luminance of the low luminance region.

Next, a black hat image is obtained by performing similar processing similar to the above by inclining the direction of the structural element by a predetermined angle dA1 with respect to the cross-sectional image 501. Then, changing of the angle is repeatedly performed such that the total change angle is smaller than 180°. Accordingly, for example, six black hat images 503 (0), 503 (30), 503 (60), 503 (90), 503 (120), and 503 (150) at respective angles of 0°, 30°, 60°, 90°, 120°, and 150° are obtained if the predetermined angle dA1 is set to 30°. A cross-sectional image 504 (black hat-totalized image) is obtained by adding a plurality of (6 images in the embodiment) the black hat images together after changing the direction of the structural element, and by dividing a luminance value of each pixel by a maximum luminance value for normalization. For example, a 256 gray scales image may be prepared such that the cross-sectional image 504 is further multiplied by 255 and rounded off to the decimal point.

In the cross-sectional image 504, the high luminance portion dotted along the position of the lumen surface of a blood vessel is the BVS. However, in some cases, an object (hereinafter, referred to as an excessively detected object) which is not a scaffold is included at the position inside the wall of the blood vessel. Hereinafter, a method of removing the excessively detected object will be described.

In accordance with an exemplary embodiment, the excessively detected object can be removed by performing a known filtering processing or threshold processing for providing the luminance or the area with a threshold value, with respect to an excessively detected object which is comparatively small, thin or has low luminance with respect to the scaffold. The image which is obtained in this manner is regarded as a cross-sectional image 505. However, in a case where the high luminance which represents periphery of scaffold is not a closed curve, which is not completely closed in the original cross-sectional image 501, the scaffold is detected as the black hat-totalized image 504, but the scaffold has low luminance almost the same as that of the excessively detected object. Therefore, it can be difficult to remove only the excessively detected object using the aforesaid filtering processing or threshold processing.

Therefore, detecting a target object near a vascular lumen as in the present embodiment, the vicinity of the vascular lumen may be separately detected and the other region may be further removed as an excessively detected object. As an example of the method of detecting the region near the vascular lumen, first, the vascular lumen is estimated as a large hole and black hat processing similar to the detection of the BVS is performed using a structural element. A closing processing images 506 and a black hat images 507 can be obtained at each predetermined angle dA2 by setting the parameter L2 of the structural element to be about the diameter of the vascular lumen and changing the direction of the structural element for each angle. Here, the method of setting the parameter L2 is the same as that of the parameter L1, and the size of the scaffold in this case (i.e. L2) includes a diameter when the scaffold is enlarged. A black hat-totalized image 508 of the vascular lumen in which the portion of the BVS is also filled with a white color is obtained by adding the obtained black hat images together for normalization.

In the original cross-sectional image 501, in many cases, the boundary of the vascular lumen is clearer than that of the excessively detected object. Therefore, in the black hat-totalized image 508, in many cases, the obtained luminance of the vascular lumen is higher than that of the excessively detected object. Moreover, a cross-sectional image 509 of the vascular lumen can be obtained from which the excessively detected object is removed, by performing a well-known filtering processing or threshold processing for providing the luminance or the area with a threshold value. Moreover, a cross-sectional image 510 with only the BVS from which the excessively detected object is removed can be obtained, by performing processing of multiplying the cross-sectional image 505 (or 504) by a binary image which is obtained by performing binarization processing at a predetermined threshold value with respect to the image 509.

In accordance with an exemplary embodiment, the signal processing unit 201 stores the cross-sectional image 510 in the memory 202 or displays the cross-sectional image 510 on the monitor 113.

Figure 6:
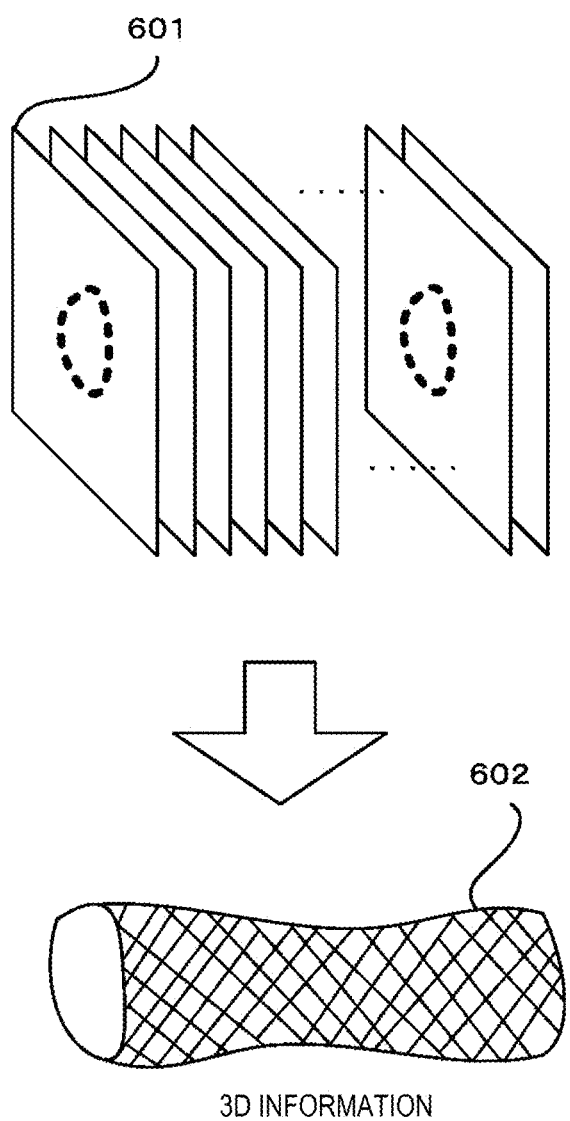
FIG. 6 is a view showing a relationship between a cross-sectional image of the bioresorbable vascular scaffold and three-dimensional model data of the bioresorbable vascular scaffold.

In accordance with an exemplary embodiment, only the BVS with high accuracy from the OCT image can be obtained by performing the aforesaid processing. As a result, a cross-sectional images 601 with only the BVS is obtained as shown in FIG. 6, and a three-dimensional BVS 602 from the cross-sectional images 601 can be constructed. In general, the nonmetallic BVS is transparent or almost transparent with respect to light in the OCT. Therefore, it is not easy to automatically discriminate the BVS on the OCT image. However, the images 601 and 602 as shown in FIG. 6 can be obtained in the embodiment. Therefore, transparency in a case of three-dimensional display, or a suitable color is assigned to the images 601 and 602, which are then combined with images 401 and 402 in FIG. 4. Accordingly, the nonmetallic BVS can be visually emphasized and displayed, which can be originally difficult to be identified.

Figure 7:
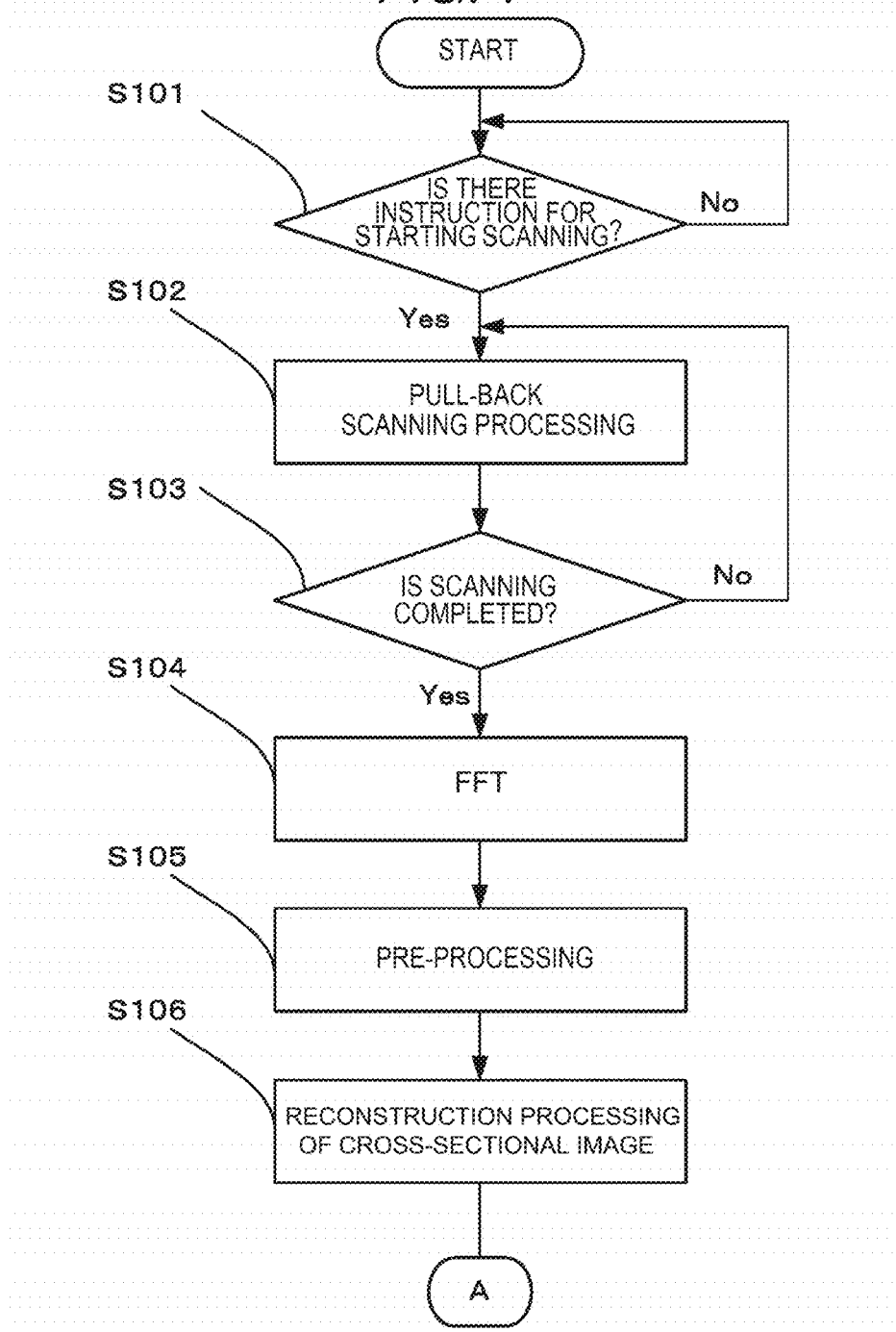
FIG. 7 is a flowchart showing a processing procedure of an imaging apparatus for diagnosis in accordance with an exemplary embodiment.
Figure 8:
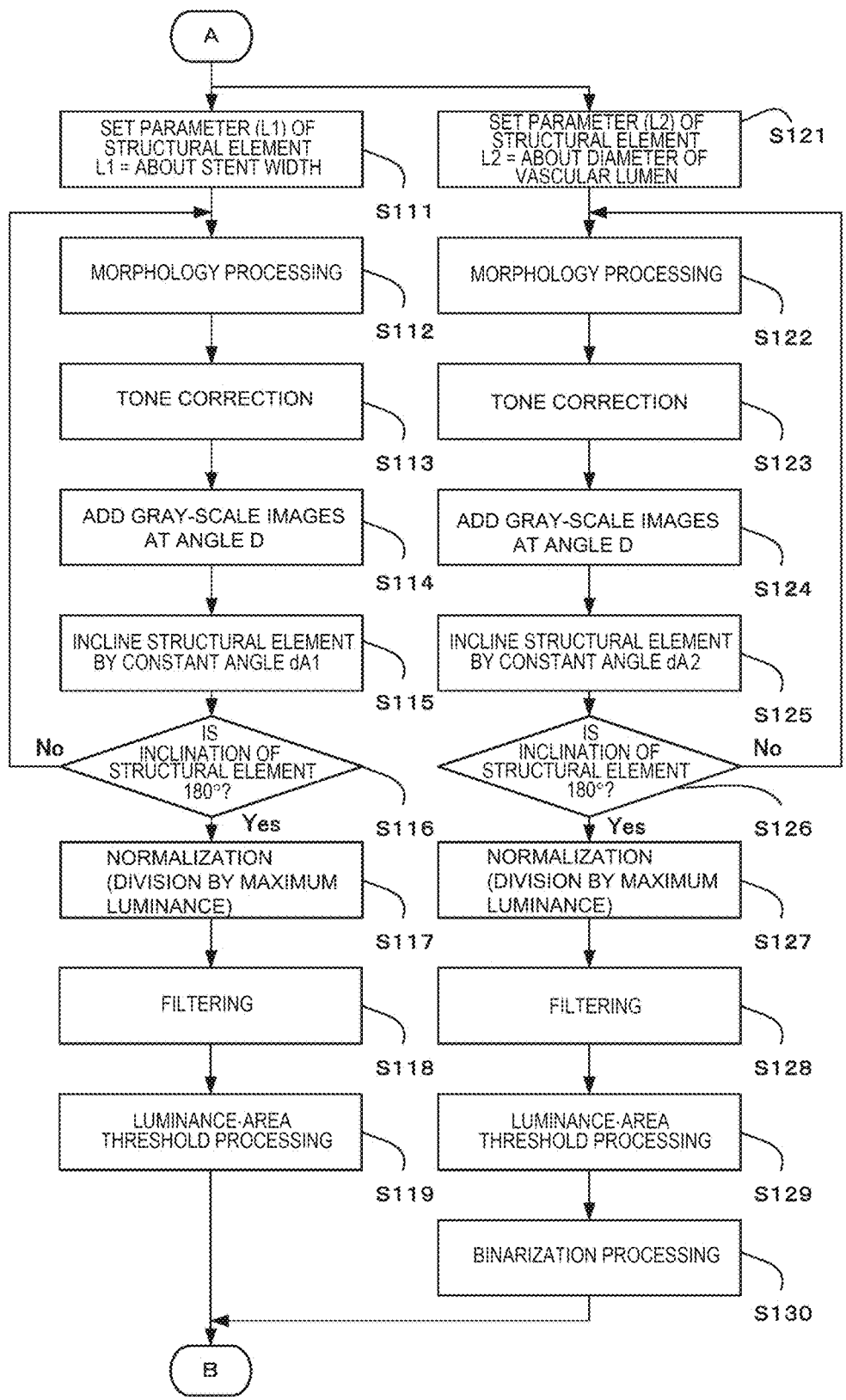
FIG. 8 is a flowchart showing a processing procedure of the imaging apparatus for diagnosis in accordance with an exemplary embodiment.
Figure 9:
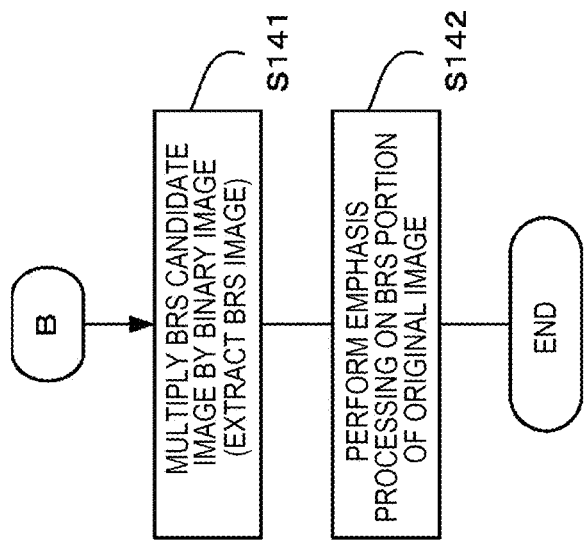
FIG. 9 is a flowchart showing a processing procedure of the imaging apparatus for diagnosis in accordance with an exemplary embodiment.

The above is the processing relating to the detection of a BVS in the embodiment. Next, the processing procedure of the signal processing unit 201 in the embodiment will be described in accordance with the flowcharts in FIGS. 7 to 9. In the following description, it is regarded that the probe 101 is already inserted into a vascular site of a target patient.

First, in step S101, it is determined whether there is an instruction for starting scanning from the operation panel 112. When it is determined that there is an instruction for starting scanning, the process proceeds to step S102 to perform pull-back scanning processing. In the pull-back scanning processing, processing in which the signal processing unit 201 causes the pull-back unit 102 to rotate the imaging core 250 at a predetermined speed, through the communication unit 208, and the imaging core 250 is retreated at a predetermined speed. As a result, interference light data in which measurement light and reference light are combined is obtained, and therefore, processing of storing the interference light data in the memory 202 is performed. Then, in step S103, it is determined whether the movement amount with respect to a blood vessel axis of the imaging core 250 became a planned movement amount, and when the result is negative, the pull-back scanning is continued.

Meanwhile, when the imaging core 250 is moved by a planned distance, the process proceeds to step S104, and fast Fourier transformation is performed on the interference light data which is stored in the memory 202. Then, in step S105, pre-processing is performed in which an image of a sheath or a guide wire, a noise, and a ring-like or radial artifact which could interrupt the detection processing later, and the result is set to line data. Then, in step S106, reconstitution processing of a cross-sectional image substantially orthogonal to a blood vessel axis is performed.

In the step S106, when the reconstitution of the cross-sectional image is completed, the process is divided into two processes. First, the process starting with step S111 will be described.

In the step S111, the parameter L1 of the structural element is set based on the thickness of the BVS. Then, morphology processing (black hat processing) is performed in step S112 and tone correction is performed with respect to the results of the processing, in step S113. Then, in step S114, the morphology processing results, which are added together up to a previous loop, are added together (which is not performed on the first loop). Then, in step S115, the direction of the structural element is inclined by a predetermined angle dA1 in preparation for next morphology processing (dA1 is added to the direction in the previous loop). In step S116, it is determined whether the direction of the structural element is inclined 180° from the first loop, and when the direction of the structural element is not inclined 180°, the process returns to the step S112, and when the direction of the structural element is inclined 180°, the process proceeds to step S117. The added images are divided by the maximum luminance for normalization. Then, in step S118, a known filtering processing using, for example, a Wiener filter or the like is performed as processing of removing the excessively detected object or pre-processing of removing thereof. In step S119, luminance area threshold processing is performed. As a result, processing of filling a black hole which has a size about the size of the scaffold on the OCT image is completed, and the cross-sectional image 505 in FIG. 5 is obtained.

Next, processing starting with step S121 will be described. In step S121, the parameter L2 of the structural element is set based on the diameter of the vascular lumen. The processes from step S122 to step S129 thereafter are the same as those in the step S112 to the step S119, and therefore, the description thereof will not be repeated. However, the value of dA2 in the step 125 and the parameter and the threshold value in the step S128 and the step S129 are different from those in the step S112 to the step S119. As a result of the processing up to the step 129, the cross-sectional image 509 in FIG. 5 can be obtained. In step 130, the cross-sectional image 509 is subjected to binarization and the detection target region is determined.

When the process proceeds to step S141, the cross-sectional image 510 is obtained by multiplying the cross-sectional image 505, which is obtained in the process up to the step S119, by a binary image, which is obtained by performing binarization on the image 509. That is, the processing of filling the black hole, which is caused by the presence of the BVS, is completed. In the last step S142, emphasis processing is performed on the cross-sectional images 401 and 501, which are the original OCT images, and on the three-dimensional blood vessel 402, based on the cross-sectional image 510. As the emphasis processing, processing for making the BVS be maximum luminance may be performed, or transparency in a case of three-dimensional display, or a suitable color may be assigned thereto.

Figure 10:
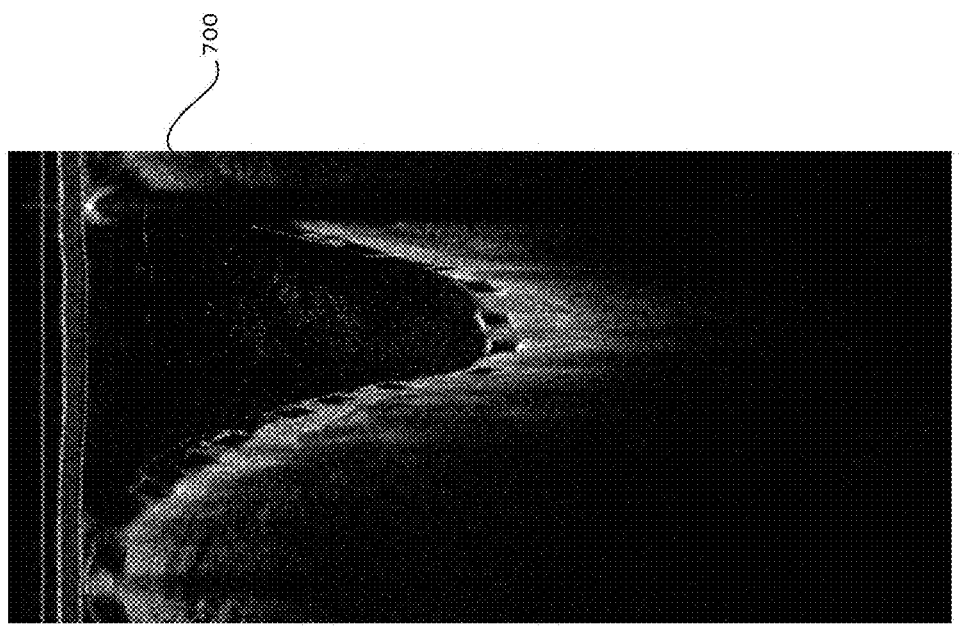
FIG. 10 is a view showing an example of an image to be processed in a second exemplary embodiment.

In the first embodiment, processing of filling a black hole, which is caused by the presence of the BVS, on the two-dimensional cross-sectional image 401 or 501 which are generated by radially arranging line data and performing known interpolation processing has been described. However, in the second embodiment, processing of filling a black hole, which is caused by the presence of the BVS, on an image 700 on which line data are aligned in parallel as shown in FIG. 10 will be described below. Note that the horizontal axis direction in FIG. 10 represents a rotary angle (θ) and the vertical direction (downward direction) in the drawing represents a distance from the rotation axis. In addition, the steps and processing in the embodiment are the same as those in the first embodiment, and therefore, only difference therebetween will be described. In addition, there is no restriction on the number of lines, which are aligned once and are processed as one image. However, for example, it can be preferable to generate one image such that lines which have traces formed by an object such as a guide wire, a metallic stent or the like which blocks light, comes at both ends of the image. As a matter of course, one image may be generated by aligning lines by one frame.

In the first embodiment, the processing of adding the black hat images, in which the length of the structural element is fixed and the angles thereof is changed, together has been performed when detecting the vascular lumen. However, in the second embodiment, the black hat images are obtained by fixing the direction of the structural element and changing the length of the structural element. In accordance with an exemplary embodiment, the longest direction between symmetric axes of the structural element is set as a main axis and the direction of the structural element is fixed such that the main axis faces the line direction.

The length of the structural element is extended by a predetermined length dL2 in the second embodiment whereas the direction of the structural element is inclined by a predetermined angle dA2 in the step S125 of the first embodiment. Here, the initial value of the length of the structural element is set to an outer radius of a sheath in a case where the sheath is removed during pre-processing, and to 1 pixel in a case where the sheath is not removed during the pre-processing. As the determination condition corresponding to the step S126, a condition is imposed in which changing of the length of the structural element is repeatedly performed such that the length of the structural element is less than the maximum display radius during measurement in a case where the sheath is removed during the pre-processing, and the length of the structural element is less than a value which is obtained by subtracting the outer radius of the sheath from the maximum display radius during the measurement in a case where the sheath is not removed during the pre-processing. In this manner, black hat images of the vascular lumen and a totalized image of the black hat images can be obtained, and the BVS from the image 700 on which the line data are aligned in parallel can be detected by performing processing of an excessively detected object based on the obtained black hat images and the totalized image thereof.

The first embodiment and the second embodiment have been described with specific examples, but the present disclosure is not limited to the embodiments.

In the present embodiments, the linear type structural element has been used as an anisotropic structural element. However, the present disclosure is not limited thereto, and the structural element may have an elliptical shape or a polygonal shape.

In the present embodiments, the length L1 which is a parameter of the structural element has been set based on the thickness of the scaffold. However, the present disclosure is not limited thereto, and the length L1 may be set based on the width of the scaffold or the length of a diagonal line. In addition, the process may returns to the step S111 before the step S117 to change the length L1 of the structural element and the step S112 to the step S116 may be repeated. Furthermore, the length L2 has been set based on the diameter of the vascular lumen. However, since the vascular lumen is not necessarily in a circular shape, for example, two values for the length L2 may be set based on the major axis and the minor axis, and the process may be repeated similarly to the case of L1. As a matter of course, processing of obtaining the black hat-totalized image may be repeated by setting a plurality of values, for the lengths L1 and L2, which are close to values shown here, as well as the values shown here as the lengths L1 and L2.

In the present embodiments, the BVS has been detected by detecting the vascular lumen and taking a common portion with the candidate image of the BVS, but the present disclosure is not limited thereto. For example, a detection target may be detected from a candidate image to be detected, by designating a detection target region so as to have a range of greater than or equal to a predetermined distance from the detected vascular lumen and less than or equal to a predetermined distance from the detected vascular lumen, or a detection target region may be designated by calculating the blood vessel wall using another technique even without using the above-described technique in order to detect the vascular lumen.

In addition, a detection target region may be calculated by newly detecting an almost closed region, which is not a detection target, as a detection target (semi-detection target). In a case where the semi-detection target is larger than the detection target, a common portion of a semi-detection target candidate image portion and a detection target candidate image portion is regarded as a detection target region. On the contrary, in a case where the semi-detection target is smaller than the detection target, a portion in which the semi-detection target candidate image portion is subtracted from the detection target candidate image portion is regarded as the region.

In addition to this, the removal of the excessively detected object may be performed by determining whether an object is excessively detected depending upon whether the object having substantially the same size is detected from a position close to the BVS while referring to a plurality of cross-sectional images which are adjacent to each other.

In the present embodiments, it has been described that the pre-processing in the step S105 is performed before the reconstitution of the cross-sectional image in the step S106. However, the present disclosure is not limited thereto, and part of or the entire pre-processing may be performed after the reconstitution of the cross-sectional image. In addition, a specific method of pre-processing is not limited, and examples thereof include threshold processing using luminance, processing of removing a predetermined region, matching processing of the shape or the characteristics, well-known filtering processing in a spatial domain or a frequency domain and the like, and the pre-processing is performed using at least one of these methods.

In addition, as another mode of the pre-processing, an image may be corrected such that the distance between an end of the image and the outline of a target object which is inserted as the OCT apparatus does not become less than or equal to the length of a structural element. For example, the image of the target object is moved in parallel or is rotated such that the outline of the target object comes to the center of the image. Other specific examples thereof include a method of adding the image with the minimum luminance value to the edge of the image.

As described above, according to the present embodiments, the position where the BVS exists can be detected. Accordingly, visualization can be performed, for example, by coloring only the BVS.

Note that in the embodiments, it is designed to detect a black hole of the BVS. For example, when the cross-sectional image 510 representing the BVS in FIG. 5 is obtained, the white pixel may be emphasized to the maximum luminance and the cross-sectional image 510 may be combined with the original image 501 for display. As a result, a user can diagnose the BVS in a sense the same as that with the metallic stent which has been used so far.

In addition, in the embodiments, it has been described that the position at which the BVS exists is detected. However, the vascular lumen can also be detected in the same way when removing the excessively detected object. Moreover, a blood vessel (vasa vasorum) existing along the blood vessel into which the OCT apparatus is inserted, other vessels, a vascular dissection in which the lumen wall of a vessel is peeled off, calcification and the like, through the same processing by changing the setting of the parameter can be detected. Therefore, the detection target is not limited to the above-described embodiments. In the embodiments, the example applied to the imaging apparatus for diagnosis (OCT) based on the light interfere using wavelength sweep has been described. However, the example can be also applied to an apparatus or a system in which the OCT and other modalities are combined, for example, an apparatus using both of IVUS and the OCT.

In addition, in the present embodiments, the case of performing measurement by rotating the imaging core using the SS-OCT apparatus has been described as an example. However, the present disclosure is not limited thereto and can also be applied to an image in a case where the imaging core is not rotated, and the second embodiment is suitable for this case. Similarly, the present disclosure can be applied to an image using a TD-OCT apparatus or a SD-OCT apparatus.

As can be seen from the aforesaid embodiments, a part of a characteristic portion in the embodiments is controlled by at least the signal processing unit 201 constituted of a microprocessor. The function of the microprocessor is realized by executing a program. Therefore, as a matter of course, the program thereof is within the category of the present disclosure. In addition, in general, the program is stored in a computer-readable storage medium such as a CD-ROM, a DVD-ROM or the like, and is executable by being set in a reading device (such as a CD-ROM drive or the like) which is possessed by a computer, and by being copied or installed in a system. Therefore, it is obvious that the computer-readable storage medium is also within the category of the present disclosure. In addition, the image described in the aforesaid embodiments has two meanings including an image as display data which is outputted and displayed on the LCD monitor 113 and a data array as non-display data which is not displayed on the LCD monitor 113.

The detailed description above describes an imaging apparatus for diagnosis, a method of controlling the same, a program, and a computer-readable storage medium. The invention is not limited, however, to the precise embodiments and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:

1. An imaging apparatus for diagnosis comprising:
a probe which accommodates an imaging core configured to perform transmission and reception of a signal;
a generation unit configured to repeat the transmission and reception of a signal with respect to an imaging target object and generate a tomographic image of the imaging target object;
a detection unit configured to detect a low luminance region, of which a pixel value is comparatively lower than a pixel value around the low luminance region, as a detection target region, by performing a morphological operation in the tomographic image; and
wherein the generation unit is configured to repeat processing of obtaining black hat images by aligning line data for generating the tomographic image of the imaging target object in parallel, set the direction of the structural element to a direction of the line data, and change the length of the structural element, within a range up to the maximum display radius, and obtain a black hat-totalized image by adding the obtained black hat images together.

2. The imaging apparatus for diagnosis according to claim 1, comprising:
an excessively detected object-removal unit configured to remove an excessively detected object from the detection target region.

3. The imaging apparatus for diagnosis according to claim 2, comprising:
a semi-detection unit configured to detect the low luminance region, which is different from the detection target region, as a semi-detection target region, by performing the morphological operation in the tomographic image; and
a region processing unit configured to compare the detection target region and the semi-detection target region with each other to set a common region or a differential region as the detection target region again, in order to remove the excessively detected object from the detection target region.

4. The imaging apparatus for diagnosis according to claim 1,
wherein an anisotropic structural element is used when performing the morphological operation.

5. An imaging apparatus for diagnosis comprising:
a probe which accommodates an imaging core configured to perform transmission and reception of a signal;
a generation unit configured to repeat the transmission and reception of a signal with respect to an imaging target object and generate a tomographic image of the imaging target object;
a detection unit configured to detect a low luminance region, of which a pixel value is comparatively lower than a pixel value around the low luminance region, as a detection target region, by performing a morphological operation in the tomographic image; and
wherein the generation unit is configured to perform interpolation processing on the line data for generating the tomographic image of the imaging target object by radially aligning the line data, set the length of the structural element based on the length representing the characteristics of the detection target, repeat processing of obtaining black hat images by inclining the direction of the structural element with respect to the tomographic image, within a range from the initial direction to less than 180 degrees, and obtain a black hat-totalized image by adding the obtained black hat images together.

6. The imaging apparatus for diagnosis according to claim 1,
wherein in the generation unit, tone correction which increases the luminance of the low luminance region is performed before adding the black hat images together.

7. The imaging apparatus for diagnosis according to claim 5,
wherein in the generation unit, tone correction which increases the luminance of the low luminance region is performed before adding the black hat images together.

8. The imaging apparatus for diagnosis according to claim 1,
wherein the signal is a light signal, and
wherein light output from a light source within the imaging apparatus for diagnosis is divided into measurement light and reference light, and the tomographic image of the imaging target object is generated based on the intensity of interference light which is obtained from the reference light and reflected light which is obtained by illuminating the imaging target object with the measurement light.

9. The imaging apparatus for diagnosis according to claim 8,
wherein the signal further includes an ultrasound signal.

10. The imaging apparatus for diagnosis according to claim 1,
wherein the imaging core for transmitting and receiving the signal with respect to the imaging target object is at least rotatable or movable in a rotation axis direction.

11. A method of controlling an image processing apparatus, which processes an image of a target object, the method comprising:
inserting a probe which accommodates an imaging core that performs transmission and reception of a signal into a living body;
repeating the transmission and reception of a signal with respect to an imaging target object and generating a tomographic image of the imaging target object;
detecting a low luminance region, of which a pixel value is comparatively lower than a pixel value around the low luminance region, as a detection target region, by performing a morphological operation in the tomographic image;
obtaining black hat images by aligning line data for generating the tomographic image of the imaging target object in parallel;
setting the direction of the structural element to a direction of the line data; and
changing the length of the structural element, within a range up to the maximum display radius, and obtaining a black hat-totalized image by adding the obtained black hat images together.

12. The method of controlling an imaging apparatus for diagnosis according to claim 11, comprising:
removing an excessively detected object from the detection target region;
detecting the low luminance region, which is different from the detection target region, as a semi-detection target region, by performing the morphological operation in the tomographic image; and
comparing the detection target region and the semi-detection target region with each other to set a common region or a differential region as the detection target region again, in order to remove the excessively detected object from the detection target region.

13. The method of controlling an imaging apparatus for diagnosis according to claim 11, comprising:
using an anisotropic structural element when performing the morphological operation.

14. A method of controlling an image processing apparatus, which processes an image of a target object, the method comprising:
inserting a probe which accommodates an imaging core that performs transmission and reception of a signal into a living body;
repeating the transmission and reception of a signal with respect to an imaging target object and generating a tomographic image of the imaging target object;
detecting a low luminance region, of which a pixel value is comparatively lower than a pixel value around the low luminance region, as a detection target region, by performing a morphological operation in the tomographic image;
performing interpolation processing on the line data to generate the tomographic image of the imaging target object by radially aligning the line data;
setting the length of the structural element based on the length representing the characteristics of the detection target, repeating obtaining black hat images by inclining the direction of the structural element with respect to the tomographic image, within a range from the initial direction to less than 180 degrees; and
obtaining a black hat-totalized image by adding the obtained black hat images together.

15. The method of controlling an imaging apparatus for diagnosis according to claim 11, comprising:
performing tone correction to increase the luminance of the low luminance region before adding the black hat images together.

16. The method of controlling an imaging apparatus for diagnosis according to claim 14, comprising:
performing tone correction to increase the luminance of the low luminance region before adding the black hat images together.

17. The method of controlling an imaging apparatus for diagnosis according to claim 11,
wherein the signal is a light signal, and
dividing light output from a light source within the imaging apparatus for diagnosis into measurement light and reference light; and
generating the tomographic image of the imaging target object based on the intensity of interference light which is obtained from the reference light and reflected light which is obtained by illuminating the imaging target object with the measurement light.

18. The method of controlling an imaging apparatus for diagnosis according to claim 11,
wherein the imaging core for transmitting and receiving the signal with respect to the imaging target object is at least rotatable or movable in a rotation axis direction.

19. The imaging apparatus for diagnosis according to claim 5, comprising:
an excessively detected object-removal unit configured to remove an excessively detected object from the detection target region;
a semi-detection unit configured to detect the low luminance region, which is different from the detection target region, as a semi-detection target region, by performing the morphological operation in the tomographic image; and
a region processing unit configured to compare the detection target region and the semi-detection target region with each other to set a common region or a differential region as the detection target region again, in order to remove the excessively detected object from the detection target region.

20. The method of controlling an imaging apparatus for diagnosis according to claim 14, comprising:
removing an excessively detected object from the detection target region;
detecting the low luminance region, which is different from the detection target region, as a semi-detection target region, by performing the morphological operation in the tomographic image; and
comparing the detection target region and the semi-detection target region with each other to set a common region or a differential region as the detection target region again, in order to remove the excessively detected object from the detection target region.

* * * * *